United States Patent [19]

Ako

[11] Patent Number: 5,278,843

[45] Date of Patent: Jan. 11, 1994

[54] MULTIPLE PROCESSOR SYSTEM AND OUTPUT ADMINISTRATION METHOD THEREOF

[75] Inventor: Hidenobu Ako, Redmond, Wash.

[73] Assignee: Teijin Seiki Co., Ltd., Osaka, Japan

[21] Appl. No.: 796,674

[22] Filed: Nov. 25, 1991

[30] Foreign Application Priority Data

Nov. 28, 1990 [JP] Japan .................. 2-331377

[51] Int. Cl.[5] .......................................... G06F 11/08
[52] U.S. Cl. ................................. 371/36; 364/269.1
[58] Field of Search ............... 371/36, 69.1, 68.1, 371/67.1, 68.3, 9.1; 364/269.1

[56] References Cited

U.S. PATENT DOCUMENTS

| | | | |
|---|---|---|---|
| 3,681,578 | 8/1972 | Stevens | 371/36 |
| 3,946,214 | 3/1976 | Stuart et al. | 235/152 |
| 4,327,437 | 4/1982 | Gelderloos | 371/68.3 |
| 4,629,342 | 12/1986 | Futaki | 400/121 |
| 4,894,830 | 1/1990 | Kawai | 371/22.3 |
| 4,998,194 | 3/1991 | Okamoto et al. | 371/36 |
| 5,023,804 | 6/1991 | Hoult | 364/498 |

Primary Examiner—Robert W. Beausoliel, Jr.
Assistant Examiner—Phung My Chung
Attorney, Agent, or Firm—Lane, Aitken & McCann

[57] ABSTRACT

A multiple processor system comprising a plurality of microprocessors, a plurality of digital filters for making outputs of the microprocessors smooth, the digital filters corresponding in number to the plurality of microprocessors, a failure judgement unit having a comparator for comparing the smoothed output data and judging the presence of failure of the plurality of microprocessors under majority rule, and a selection and output unit for selecting, on the basis of the result of the judgement of the failure judgement unit and a predetermined priority order, an output of the microprocessor in which there is no failure and whose priority order is higher and for outputting the selected output as an output of the multiple processor system.

5 Claims, 2 Drawing Sheets

MULTIPLE PROCESSOR SYSTEM AND OUTPUT ADMINISTRATION METHOD THEREOF

FIELD OF THE INVENTION

The present invention relates to a multiple processor system and an administrative method for administering the output of the system.

DESCRIPTION OF THE PRIOR ART

In computer systems which require a high operational reliability, such as flight control computer systems of aircraft, a plurality of processors are provided in parallel to implement the processing of the same object, and if, for example, one of the processors fails, the outputs of the other normal processors will be used not so as to stop the function of the whole system. In addition, in such multiple processor systems in which redundancy is provided by multiplexing, taking into consideration the case that the software or hardware of the processors includes the potential bugs or defects that cannot be found by normal troubleshooting, the processors are constituted by different processors of different kinds. Furthermore, in order to improve the operational reliability in the input side of the system, the upstream computers, sensors and the like have been multiplexed.

The conventional multiple processor of the above kind and the output administration method therefor, however, have their disadvantages in that the sychronization of the output of each processor is reduced and the change or fluctuation in the output of each processor become large, notwithstanding that the inputs to the processors from the upstream computers, etc. are in asynchronism and the input data do not completely coincide. The reason for this is that these inputs are processed by the independent hardware and software of different kinds. In the output administration of the multiple processor system, it is not easy to compare the outputs of the processors which have fluctuated spontaneously, and there is the possibility that the spontaneous fluctuations in the processor outputs is judged to be failure by mistake by judging those fluctuations to be an inconsistency of data.

It is, accordingly, an important object of the present invention to provide a multiple processor system and an output administration method therefor in which the reliability of failure judgement is enhanced by preventing the spontaneous fluctuations from being judged to be an inconsistency of data by mistake.

SUMMARY OF THE INVENTION

In accordance with one important aspect of the present invention, there is provided a multiple processor system comprising a plurality of microprocessors, a plurality of digital filters for making outputs of the microprocessors smooth, the digital filters corresponding in number to the plurality of microprocessors, and failure judgement means having a comparator for comparing the smoothed output data and judging the presence of failure of the plurality of microprocessors under majority rule. The multiple processor system further comprises selection and output means for selecting, on the basis of the result of the judgement of the failure judgement means and a predetermined priority order, an output of the microprocessor in which there is no failure and whose priority order is higher and for outputting the selected output as an output of the multiple processor system.

In the multiple processor system of the present invention, the outputs of the microprocessors are made smooth by the digital filters and compared, and the presence of failure of the microprocessors under majority rule is judged. On the other hand, on the basis of the result of the judgement and a predetermined priority order, an output of the microprocessor in which there is no failure and whose priority order is higher is selected and outputted as an output of the multiple processor system. Therefore, in comparing the microprocessor outputs, the fluctuations in the smoothed microprocessor outputs become minimum and the spontaneous fluctuations are prevented from being judged to be the inconsistency of data by mistake.

The multiple processor system may further comprise a plurality of buffers for accumulating the outputs of the microprocessors, each of the buffers being provided between the corresponding microprocessor and the corresponding digital filter and between the corresponding microprocessor and the selection and output means. Since the microprocessor outputs are accumulated in the buffers prior to the smoothing processing by the digital filters and the selection and output by the selection and output means, the asynchronism of the microprocessor outputs is absorbed by the buffers, so the reliability of the failure judgement can be enhanced.

In accordance with another important aspect of the present invention, there is provided an output administration method for use in a multiple processor system including a plurality of microprocessors, comprising the steps of smoothing outputs of the microprocessors, comparing the smoothed output data and judging the presence of failure of the microprocessors under majority rule, selecting, on the basis of the result of the failure judgement and a predetermined priority order, an output of the microprocessor in which there is no failure and whose priority order is higher, and outputting the selected output as an output of the multiple processor system.

In the output administration method of the present invention, the outputs of the microprocessors are smoothed and compared, and the presence of failure of the microprocessors under majority rule is judged. On the other hand, on the basis of the result of the judgment and a predetermined priority order, an output of the microprocessor in which there is no failure and whose priority order is higher is selected and outputted as an output of the multiple processor system. Therefore, in comparing the microprocessor outputs, the fluctuations in the smoothed microprocessor outputs become minimum and the spontaneous fluctuations are prevented from being judged to be the inconsistency of data by mistake.

The output administration method may further comprise the step of accumulating the outputs of the microprocessors prior to the smoothing step and the selecting step. Since the microprocessor outputs are accumulated prior to the smoothing step and the selecting step, the asynchronism of the microprocessor outputs is absorbed, so the reliability of the failure judgment can be enhanced.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENTS

Figure 1:
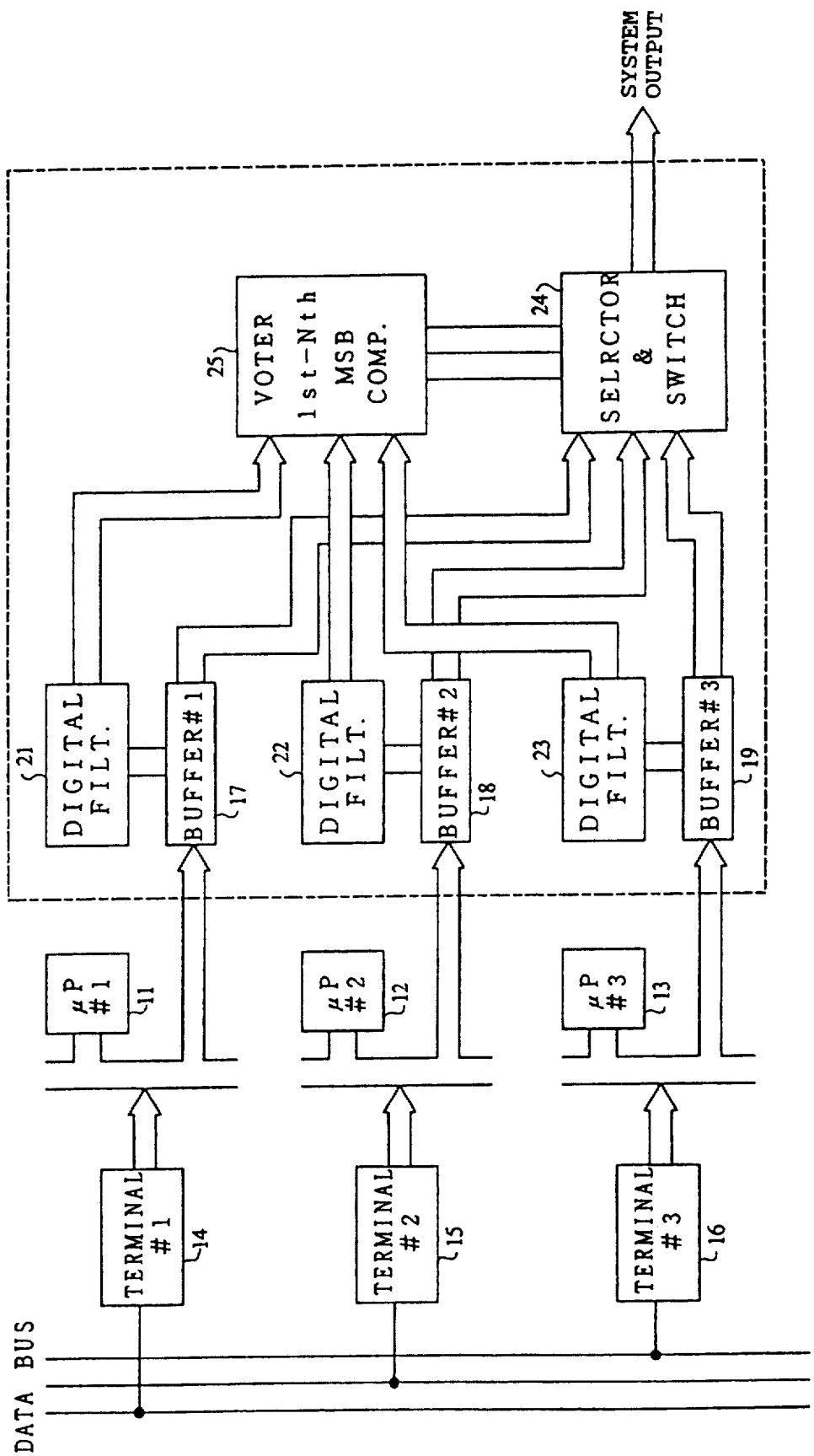
FIG. 1 is a block diagram of an embodiment of a multiple processor system according to the present invention.

Referring to FIG. 1, there is shown a preferred embodiment of a multiple processor system in accordance with the present invention. The multiple processor system comprises a plurality of different microprocessors 11, 12 and 13 of different kinds, in order to provide redundancy. The input side of the multiple processor system, that is, the upstream computers and sensors (not shown) for transmitting signals to the microprocessors 11, 12 and 13 are also multiplexed to enhance the operational reliability in the whole system. The microprocessors 11, 12 and 13 are connected with communication terminals 14, 15 and 16, respectively. The communication terminals 14, 15 and 16 are coupled to data buses, respectively, so that the data transmitted to the data buses from the above mentioned upstream computers and sensors are inputted to the microprocessors 11, 12 and 13. The microprocessors 11, 12 and 13 access the data on the respective data buses and process the data in accordance with respective different programs, and as a result, arithmetic operation of the same object is implemented. From the standpoint of the reliability of data, each processor system is given priority in the order of, for example, 11, 12 and 13.

The outputs of the processors 11, 12 and 13 are inputted to and held (accumulated) in buffers 17, 18 and 19, respectively. The data in the buffers 17, 18 and 19 are transmitted to digital filters 21, 22 and 23 such as moving average filters, respectively, in which the data are made smooth. The data in the buffers 17, 18 and 19 are also inputted to a selector and switch 24, without being subjected to the smooth processing. The digital filters 21, 22 and 23 make smooth the data transmitted from the buffers 17, 18 and 19 and output the smoothed data to a voter 25 at predetermined timing. The voter 25 is failure judgment means which compares the data made smooth by the digital filters 21, 22 and 23, judges the abnormality of the outputs of the individual processors 11, 12 and 13, that is, the failure of each processor system on the basis of majority rule based on the result of the comparison, and transmits the result of the judgment to the selector and switch 24.

The selector and switch 24 is selection and output means which selects the output of the processor in which there is no failure and whose priority order is higher, on the basis of the judgement result of the voter 25 and of the predetermined priority order of the processors 11, 12 and 13, and which outputs the selected output as the output of the system. If it is assumed that the microprocessors 11, 12 and 13 after the smooth processing by the digital filters 21, 22 and 23 have their outputs as shown in table 1, predetermined higher bits, for example, higher 6 bits are compared, and the output of the microprocessor 11 (#1) is judged to be an error under the majority rule, because the microprocessor 11 (#1) does not coincide with the other microprocessors and the microprocessor 12 (#2) coincides with the microprocessor 13 (#3).

TABLE 1

| μP | Comparison (higher 6 bits) | Disregard |
|---|---|---|
| #1 | 101100 | 11 |
| #2 | 101111 | 01 |
| #3 | 101111 | 10 |

In addition, as shown in table 1, the judgment is performed disregarding predetermined bits (lower 2 bits), in order to exclude the normal regions or spontaneous fluctuations of the outputs of the microprocessors 11, 12 and 13. That is, when the output of each processor is within normal fluctuation, bits to be compared are set to predetermined higher bits (6 bits) so that the comparison values of the processors 11, 12 and 13 are determined to be the same. For example, when the judgment based on the above mentioned majority rule cannot be made by comparison of higher 6 bits, comparison of 5 bits as shown in table 2 can be made by incorporating a suitable logic circuit (sequence circuit) into the judgment circuit, and furthermore comparison of higher 4 bits can be made as shown in table 3.

TABLE 2

| μP | Comparison (higher 5 bits) | Disregard |
|---|---|---|
| #1 | 10110 | 011 |
| #2 | 10111 | 001 |
| #3 | 10111 | 110 |

TABLE 3

| μP | Comparison (higher 4 bits) | Disregard |
|---|---|---|
| #1 | 1010 | 0011 |
| #2 | 1011 | 0001 |
| #3 | 1011 | 1110 |

In addition, in order to prevent the filter calculation or failure judgement during the writing of data to the buffers 17-19, the digital filters 21-23 and the voter 25 can be timing controlled by a control signal of a chip containing the filter calculation or failure judgment.

Since the redundancy administration circuit according to the present invention can be constituted by a hardware digital circuit that do not use software, the circuits that are disposed downstream of the processors 11-13, that is, the buffers 17-19, digital filers 21-23, selector and switch 24 and the voter 25 are all constituted by hardware digital circuits in order to enhance the reliability in the redundancy administration itself.

The operation of the multiple processor system and the output administration method for the multiple processor system will hereinafter be described in detail.

Data are transmitted from the upstream computers and sensors (in this embodiment, these are multiplexed) to the data buses. These data are basically the same, but it can be considered that the data are delicately in abynchronism and somewhat fluctuate. Therefore, the inputs to the microprocessors 11-13 from the communication terminals 14-16 fluctuate slightly, and the outputs of the microprocessors 11-13 are not in complete synchronism and contain spontaneous fluctuations.

Figure 2:
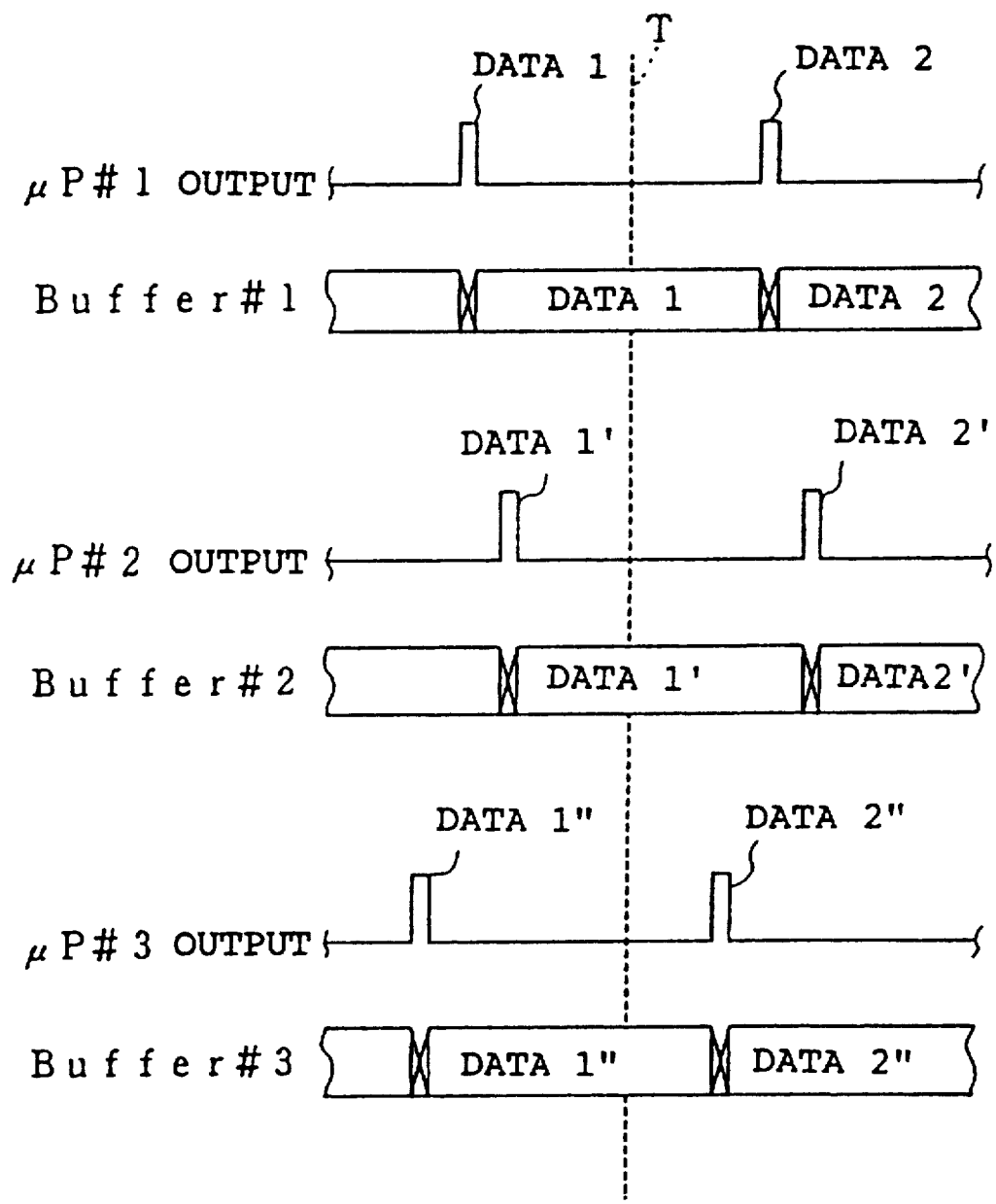
FIG. 2 is a diagram showing the relationship between the output of the microprocessor and the data held in the buffer.

In the embodiment of the present invention, the outputs of the microprocessors 11, 12 and 13 are first held in the buffers 17, 18 and 19, respectively, and then the held data are smoothed by the digital filters 21, 22 and 23. The data within a certain time are therefore averaged by the digital filters 21, 22 and 23, and the spontaneous fluctuation in the data are alleviated. In addition, between each microprocessor and each buffer there is the relationship as shown in FIG. 2, and the filter calculation and the voting or failure judgment by the voter 25 are performed at timing T at which there is no influence of the fluctuations in the output timings of the microprocessors 11-13. That is, prior to the smoothing process by the digital filters 21-23 and the selection and output by the selector and switch 24, the outputs from the microprocessors 11, 12 and 13 are accumulated in the buffers 17, 18 and 19, and the asynchronism of the outputs of the microprocessors are absorbed by the buffers 17, 18 and 19. As a result, the data comparison by the voter 25 become possible.

Thereafter, the output data smoothed by the digital filters 21-23 are compared by the voter 25, and then the voter 25 judges if the microprocessors 11-13 have failed on the basis of the majority rule and outputs the result of the judgment to the selector and switch 24. At this time, that is, when the outputs of the microprocessors 11-13 are compared by the voter 25, the fluctuations in the output data from the digital filters 21-23 become minimum and the spontaneous fluctuations are prevented from being determined to be the inconsistency of data by mistake. Then, the selector and switch 24 selects and outputs the output of the processor system in which there is no failure and whose priority order is higher, on the basis of the judgment result of the failure judgment by the voter 25 and of the predetermined priority order between the microprocessors 11-13. Therefore, if it is assumed that failure occurred in any one of the microprocessors 11-13 or the upstream circuits, for example, the microprocessor 11, the output of the microprocessor 11 is separated from the multiple processor system output and the output of the microprocessor 12 which is in normal and in the next priority order is selected and then the actual processor output accumulated in the buffer 18 is outputted as the multiple processor system output.

In a case where, for example, the microprocessor 11 whose priority order is highest outputs abnormal data temporarily because of external factors such as the electromagnetic failure to the data buses, the transmission line through the microprocessor 11 is interrupted temporarily by the selector and switch 24 on the basis of the comparison result of the voter 25. In that case, if the above mentioned external factors are removed and the abnormalities in the outputs of the microprocessors 11-13 disappear, then the output of the microprocessor 11 which is higher in reliability is selected by the selector and switch 24 and the multiple processor system returns to its normal output state.

Since in the present invention the selector and switch circuit 24, the voter 25 and the like which are disposed downstream of the microprocessors 11-13 are constituted by hardware logic circuits, a higher operational reliability can be assured.

Although the above embodiment has been constituted by a triple system, the similar redundancy administration is possible for a multiple system of more than three. In addition, the number of comparison bits in the failure judgment can be set to an arbitrary number. For example, the comparison bit number can be set to 15 by a 16-bit CPU.

While the subjection invention has been described with relation to the preferred embodiment, various modifications and adaptations thereof will now be apparent to those skilled in the art. All such modifications and adaptations as fall within the scope of the appended claims are intended to be covered thereby.

What I claim is:

1. A multiple processor system comprising:
   a plurality of microprocessors constituted by different microprocessors of different kinds;
   a plurality of digital filters for making output data of said microprocessors smooth, said digital filters corresponding in number to said plurality of microprocessors, and the smoothed output data from each digital filter comprising a sequence of number values each comprising a plurality of digits, respectively;
   failure judgment means having a comparator for comparing predetermined digits of said smoothed output data and judging the presence of failure of said plurality of microprocessors under majority rule, said predetermined digits being fewer than the number of digits in each number value of said smoothed output data; and
   selection and output means for selecting, on the basis of the result of the judgment of said failure judgment means and a predetermined priority order, an output of one of said plurality of microprocessors in which there is no failure and whose priority order is higher among said plurality of microprocessors and for outputting the selected output as an output of said multiple processor system.

2. A multiple processor system as set forth in claim 1, which further comprises a plurality of buffers for accumulating said output data of said microprocessors, each of said buffers being provided between the corresponding microprocessor and the corresponding digital filter and between the corresponding microprocessor and said selection and output means.

3. A multiple processor system as recited in claim 1, wherein said digital filters make the output data smooth by calculating the moving average of said output data.

4. An output administration method for use in a multiple processor system including a plurality of microprocessors different in kind, comprising the steps of:
   digitally filtering output data of said microprocessors to smooth said output data of said microprocessors, the smoothed output data from each digital filter comprising a sequence of number values each comprising a plurality of digits, respectively;
   comparing predetermined digits of said smoothed output data and judging the presence of failure of said microprocessors under majority rule, said predetermined digits being fewer than the number of digits in each number value of said smoothed output data;
   selecting, on the basis of the result of the failure judgment and a predetermined priority order, an output of one of said microprocessors in which there is no failure and whose priority order is higher among said microprocessors; and
   outputting the selected output as an output of said multiple processor system.

5. An output administration method as set forth in claim 4, which further comprises the step of accumulating said output data of said microprocessors prior to said digitally filtering step and said selecting step.

* * * * *